United States Patent [19]
Rehn

[11] 3,912,017
[45] Oct. 14, 1975

[54] AUTOMATIC LEVELING MECHANISM FOR DISK HARROWS

[75] Inventor: Gary Allen Rehn, Andover, Ill.

[73] Assignee: Deere & Company, Moline, Ill.

[22] Filed: June 21, 1973

[21] Appl. No.: 372,377

[52] U.S. Cl. .............................................. 172/328
[51] Int. Cl.² ...................................... A01B 59/00
[58] Field of Search .................... 172/324, 326–328; 280/414.5

[56] References Cited
UNITED STATES PATENTS

| | | | |
|---|---|---|---|
| 2,320,742 | 6/1943 | Newkirk | 172/328 |
| 2,717,479 | 9/1955 | Scheidenhelm et al. | 172/328 |
| 2,754,739 | 7/1956 | Estes | 172/328 X |
| 2,797,542 | 7/1957 | Webster et al. | 172/328 |
| 3,082,830 | 3/1963 | McKay | 172/328 |
| 3,708,018 | 1/1973 | Wilbeck | 172/328 X |
| 3,777,823 | 12/1973 | Holfeld | 172/328 |
| 3,809,165 | 5/1974 | Miller | 172/328 |

Primary Examiner—Stephen C. Pellegrino

[57] ABSTRACT

Mechanism for automatically maintaining the frame of a disk harrow in a level condition as the frame is raised and lowered relative to the ground, and for adjusting the fore-and-aft weight distribution of the harrow when in its lowered working position, the mechanism including an upright lever pivotally mounted on the forward end of the frame, a compression link connecting a vertically swingable hitch with the lower end of the lever, and a fore-and-aft extending tension link connected at the forward end to the upper end of the lever and slidably received at its rearward end in a trunnion rotatably mounted on the upper end of an arm fixed to a ground wheel control shaft. A compression spring is received on the extreme rear end of the tension link and acts between an abutment on the end of the link and the rear side of the trunnion to bias the tension link rearwardly and thereby bias a stop on the upper end of the lever rearwardly into engagement with the frame.

19 Claims, 4 Drawing Figures

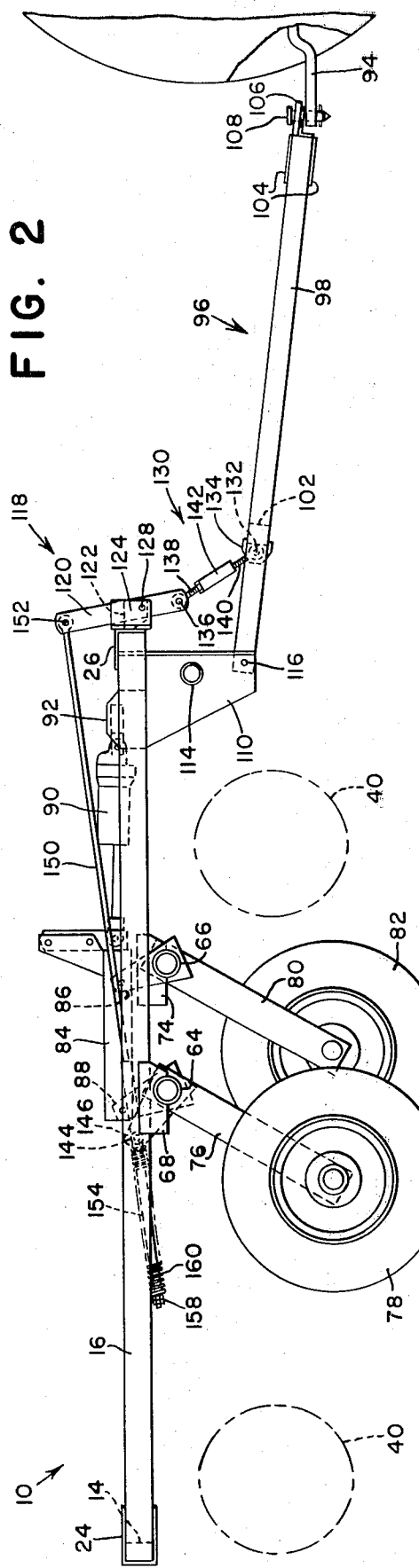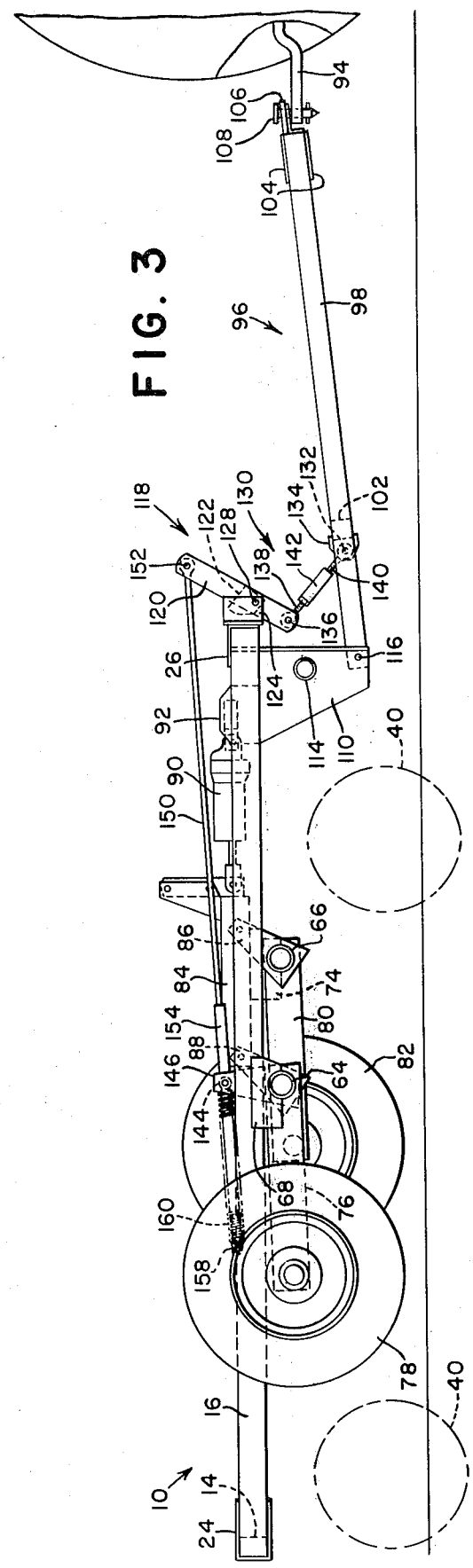

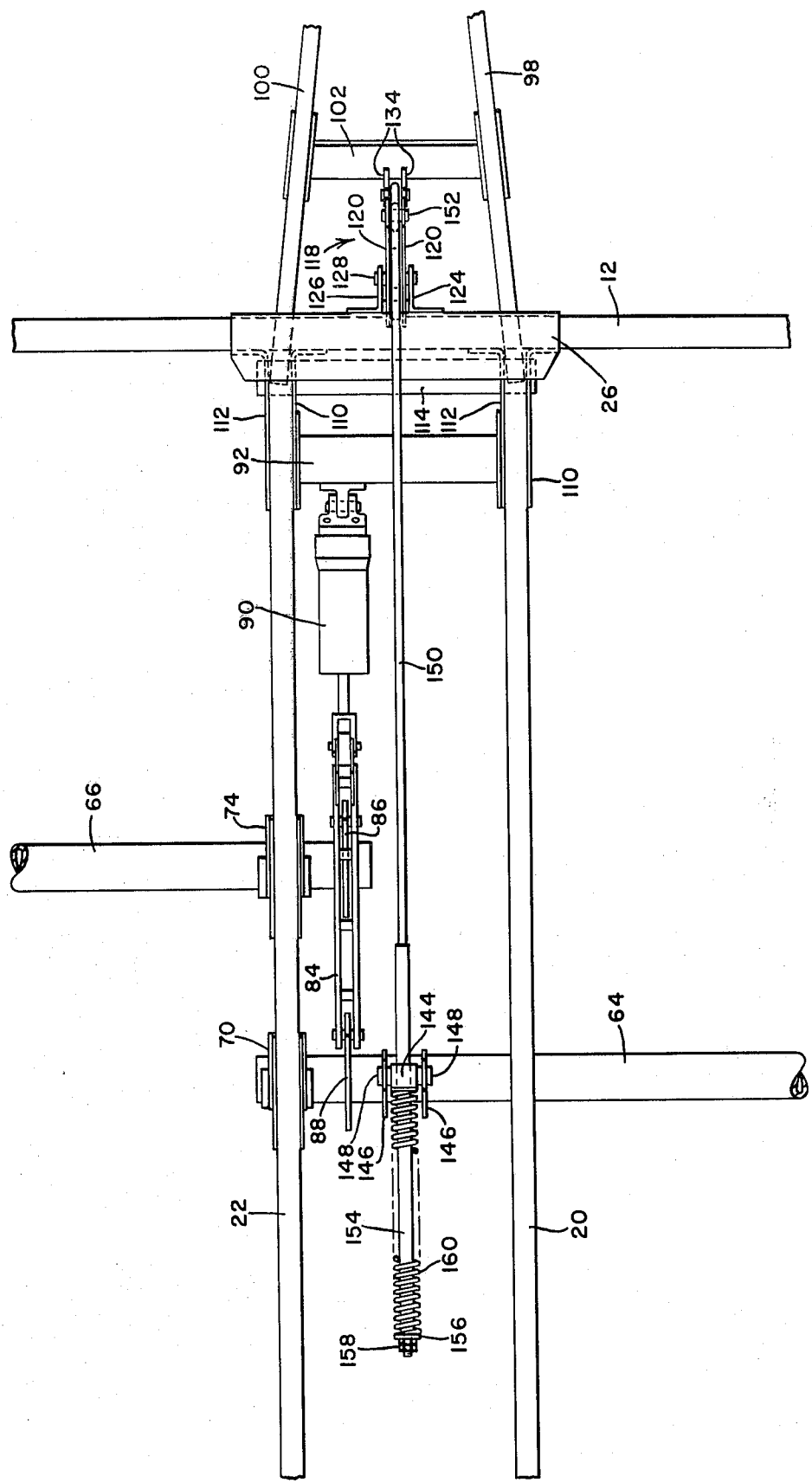

AUTOMATIC LEVELING MECHANISM FOR DISK HARROWS

BACKGROUND OF THE INVENTION

The present invention relates generally to agricultural implements and more particularly to an automatic leveling mechanism for use on disk harrows or the like.

A disk harrow implement conventionally includes an elongated hitch structure on its forward end, the structure having a clevis or other means on its forward end adapted for connection to the drawbar of a tractor. The structure is commonly mounted on the frame for vertical adjustment about a transverse axis so that the fore-and-aft weight distribution of the harrow can be varied to alter the relative depth of penetration of the front and rear disk gangs. It is normally desirable to maintain a generally equal working depth of the front and rear gangs, but for a constant weight distribution, the working depth will vary in accordance with soil condition. The weight of the machine acting on the front and rear gangs may be adjusted by varying the position of the hitch relative to the frame and thereby altering the vertical force exerted by the hitch on the tractor drawbar. For example, if the hitch is adjusted downwardly, machine weight is shifted from the front gang to the tractor drawbar and to the rear gang. Conversely, if the hitch is adjusted upwardly, machine weight is shifted from both the tractor drawbar and the rear gang to the front gang.

In the past, an adjustable, double-acting spring connection has been provided between the disk harrow frame and the hitch structure to provide means for varying the fore-and-aft weight distribution of the harrow and also to accommodate a limited range of relative movement between the hitch and frame. Such a construction is shown, for example, in U.S. Pat. No. 2,985,247 which issued to Oehler et al on May 23, 1961. As a harrow constructed in this manner is lowered into engagement with the ground, one of the springs is compressed as the hitch swings upwardly relative to the frame from its transport position to its working position. Although a certain leveling effect of the harrow frame is realized through such movement of the hitch structure, it is achieved only by tranferring a substantial portion of the machine weight to the drawbar of the tractor when the machine is lowered to its working position. The transfer of machine weight to the drawbar, of course, reduces the weight carried by the disks which, in turn, decreases the penetration capability of the implement.

An additional problem inherent in such conventional construction lies in the fact that an adjustment made in the spring connection to level the harrow in its operating position will affect the orientation of the frame when the harrow is raised to its transport position. Yet a further problem area resulting from such conventional construction is that of transport stability. The spring connection between the hitch and frame permits the latter to pivot relative to the former during transport, which, in turn, permits the frame to rock fore and aft about the axis of its ground support wheels. Although a certain amount of shock absorbing capability in the hitch-to-frame connection is desirable, the excessive resiliency present in conventionally designed harrows results in poor transport stability and control.

In partial solution to the aforementioned problems, it has been proposed to provide an interconnection between the hitch and the ground support wheels of the harrow, so that the hitch will move vertically in response to movement of the wheels relative to the frame and thereby automatically maintain the frame in a level condition as it is raised and lowered. Such a construction is shown, for example, in U.S. Pat. No. 3,299,966 which issued on Jan. 24, 1967 to Clifford. Although certain of the problems inherent in the aforedescribed prior art are overcome by this construction, the problem of affecting the transport orientation of the frame when making working adjustments, and the problem of transport stability, remain.

SUMMARY OF THE INVENTION

It is, accordingly, a primary object of the invention to provide a hitch structure for an agricultural implement such as a disk harrow or the like which is possessed of none of the aforementioned problems of the prior art.

More particularly, it is an object to provide a hitch structure which is operative to automatically maintain the implement frame in a level condition as the frame is raised and lowered between its transport and working positions.

It is a further object to provide such mechanism having means for effecting adjustment of the fore-and-aft weight distribution of the harrow when in its working position without affecting the orientation of the frame when raised to its transport position.

It is yet a further object to provide such a mechanism having means providing resiliency in the hitch frame connection when the implement is disposed in its working position, but providing a substantially more rigid hitch-to-frame connection when the implement is raised to its transport position, whereby the implement remains stable during transport yet the hitch-to-frame connection is sufficiently resilient to cushion excessive dynamic loads.

In pursuance of these and other objects, the invention comprises, generally, a frame, at least a pair of ground wheels mounted on the frame for vertical movement to adjust the height of the frame, a hitch mounted on the forward end of the frame for vertical adjustment, a front support mounted on the forward end of the frame and connected to the hitch so that it moves fore-and-aft in response to vertical movement of the hitch, a stop to limit the rearward movement of the support, a rear support mounted on the frame and connected to the ground wheels to move fore-and-aft in response to vertical movement of the wheels, a fore-and-aft extending tension link connected at its forward end to the front support and slidably received at its rearward end in the rear support, and a compression spring acting between the end of the link and the rear support to bias the link rearwardly relative to the rear support and thereby bias the front support toward its extreme rearward position.

BRIEF DESCRIPTION OF THE DRAWINGS

The preferred embodiment of the invention will be described in conjunction with the accompanying drawings in which:

FIG. 2 is a right side elevational view of the disk harrow shown in FIG. 1, the harrow being shown in its raised, transport position;

FIG. 3 is a view similar to FIG. 2 but showing the harrow in its lowered, working position; and FIG. 4 is a fragmentary plan view of the disk harrow, showing the automatic leveling mechanism.

DESCRIPTION OF THE PREFERRED EMBODIMENT

Figure 1:
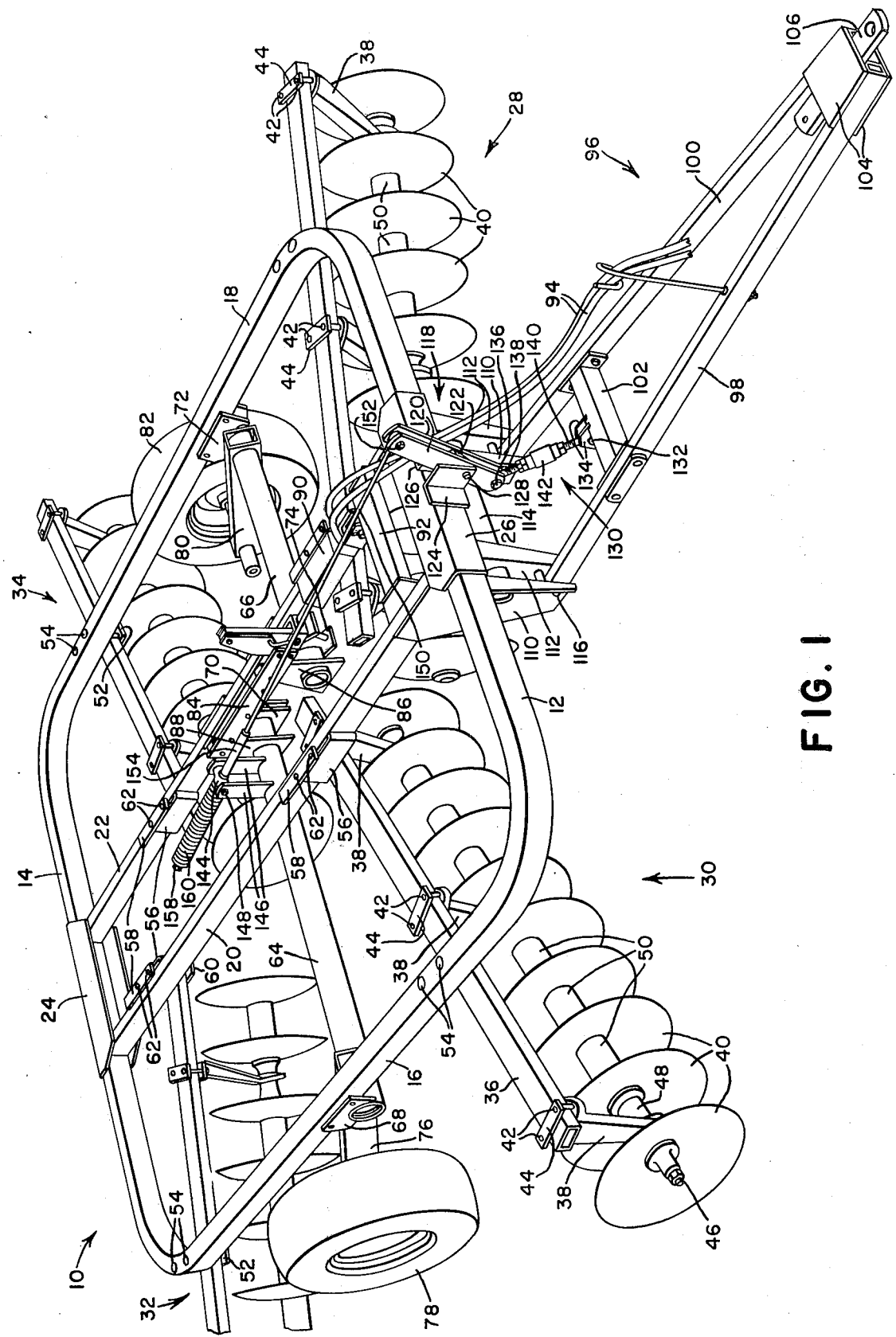
FIG. 1 is a perspective view of a disk harrow incorporating the automatic leveling mechanism of the invention, taken from the right front of the machine.

In the ensuing description, right- and left-hand reference is determined by facing in the direction of travel of the harrow.

Referring now to the drawings, the disk harrow illustrated includes a frame 10 composed of a structural tube formed in the shape of a rectangle with rounded corners, the rectangle including transversely extending, front and rear sides 12 and 14, respectively, and fore-and-aft extending, right and left sides 16 and 18, respectively. The center portions of the front and rear sides are connected by a pair of parallel, fore-and-aft extending structural tube sections 20 and 22. A forwardly opening, U-shaped plate 24 extends around the center portion of the rear side 14 of the frame and extends forwardly along both the upper and lower sides of the rear end portions of the tube sections 20 and 22 to reinforce the connection between these members, and an L-shaped plate 26 extends around the rear and top sides of the center portion of the front side 12 of the frame and rearwardly along the upper sides of the forward end portions of the tube sections 20 and 22 to reinforce the connection between these members.

Supported beneath the forward end of the frame 10 is a right and left pair of forwardly diverging disk gangs 28 and 30, respectively, and supported beneath the rearward end of the frame is a right and left pair of rearwardly diverging disk gangs 32 and 34, respectively. The gangs 28–34 are of conventional construction and each includes an elongated tubular frame 36, a plurality of vertical standards 38 connected at their upper ends to the frame 36, and an elongated gang of disks 40 rotatably supported on the lower ends of the standards 38. The standards 38 are connected to the frame 36 by a pair of bolts 42 which extend vertically through the upper end of the standard, along the front and rear sides of the frame 36, and are connected at their upper ends to a plate 44 that engages the top side of the frame. Each gang of disks is of conventional construction and includes, in addition to the disks 40, a gang bolt 46 that extends axially through the disks, a bearing 48 for the gang bolt mounted on the lower end of each of the standards 38, and a plurality of cylindrical spacers 50 disposed between adjacent disks.

The disk gangs are supported on the frame in a staggered arrangement described fully in U.S. Pat. No. 3,734,199 which issued May 22, 1973 to Tsuchiya et al, and the working angle of each gang is adjustable to accommodate different soil conditions. The medial portion of each gang frame 36 is supported on one of the sides 16 and 18 of the frame at a fixed fore-and-aft location, and the inner end thereof is supported on one of its sections 20 and 22 for adjustment in a fore-and-aft direction. The medial support consists of a plate 52 disposed beneath the gang frame, and a pair of bolts 54 which extend downwardly through the frame and are connected to opposite ends of the plate 52. The bolts 54 are provided with nuts on their lower ends which may be loosened to permit angular adjustment of the gang frame 36 relative to the frame. The inner, adjustable support for each gang frame consists of a U-shaped bracket 56 secured to the side of one of the fore-and-aft sections 20 and 22, a first plate 58 on the top side of the brocket 56, a second plate 60 on the underside of the gang frame 36, and a pair of bolts 62 which extend downwardly through opposite ends of the first plate 58, through the space between the bracket 56 and side of the tube section, and are connected to opposite ends of the second plate 60. The bolts 62 are provided with nuts on their lower ends which may be loosened to permit fore-and-aft adjustment of the inner end of the disk gang relative to the bracket 56.

A right and left pair of transversely extending, longitudinally spaced wheel control shafts 64 and 66, respectively, are rotatably supported on the underside of the frame between the front and rear pairs of disk gangs. The right shaft 64 is supported at its outer end on the frame side 16 by means of a bracket 68 and at its inner end on the tube section 22 by means of a bracket 70. In a similar manner, the left shaft 66 is supported at its outer end on the frame side 18 by means of a bracket 72 and at its inner end on the tube section 22 by means of a bracket 74 disposed forwardly of and in fore-and-aft alignment with the bracket 70. The outer end of the right shaft 64 has a downwardly and rearwardly extending wheel arm 76 connected thereto, and the arm 76, in turn, has a ground-engaging wheel 78 rotatably mounted on its outer end. In like manner, the outer end of the left shaft 66 has a downwardly and rearwardly extending wheel arm 80 connected thereto, and the arm 80, in turn, has a ground-engaging wheel 82 rotatably mounted on its outer end.

It will be appreciated from the construction described thus far that rotation of the shafts 64 and 66 will move the wheels 78 and 82 through arcuate paths described about the axes of the shafts, and that such movement of the wheels will, in turn, result in vertical movement of the frame relative to the ground. The shafts 64 and 66 are interconnected by a link assembly 84 so that they will rotate in unison. The forward end of the link is pivotally connected to the upper end of an upright arm 86 fixed to the extreme inner end of the shaft 66, and the rearward end thereof is pivotally connected to the upper end of an upright arm 88 fixed to the inner end of the shaft 64 in fore-and-aft alignment with the arm 86. Rotational movement of the shafts 64 and 66 is effected by means of an extensible and retractable hydraulic cylinder 90 that acts between the forward end of the link assembly 84 and a bracket structure 92 that extends between and is fixedly connected to the forward ends of the tube sections 20 and 22. The hydraulic cylinder is connected to the hydraulic system of the tractor used for towing the harrow by a pair of hydraulic hoses 94. It will be apparent from the foregoing description that extension of the cylinder 90 will cause the shafts 64 and 66 to rotate in a counterclockwise direction as viewed from the right side of the machine, which, in turn, will move the wheels 78 and 82 downwardly relative to the frame to thereby raise the frame relative to the ground. Conversely, retraction of the cylinder 90 will rotate the shafts 64 and 66 in a clockwise direction as viewed from the right which will, in turn, move the wheels 78 and 82 upwardly relative to the frame to thereby lower the frame relative to the ground.

The frame 10 may be connected to the drawbar 94 of a conventional agricultural tractor by means of a hitch structure connected to the forward end of the frame and designated generally by the numeral 96. The structure 96 consists of a pair of forwardly converging tube sections 98 and 100, a transverse brace 102 extending between the rear portions of the sections 98 and 100, a pair of upper and lower plates 104 connecting the forward ends of the sections, and a bar 106 connected to the upper plate 104 and extending forwardly therefrom. The forward end of the bar 106 is apertured to receive a pin 108 for connecting the hitch structure to the tractor drawbar. Identical pairs of hitch support plates 110 and 112 are fixed to the forward ends of the frame tube sections 20 and 22 and extend downwardly therefrom. A transverse cylindrical tube section 114 interconnects the support plates 110 and 112 beneath the frame sections 20 and 22. The hitch structure 96 is connected to the frame for vertical pivotal movement about a transverse axis, by means of pins 116 which extend transversely between each pair of support plates 110 and 112 and pivotally support the ends of the hitch sections 98 and 100 therebetween.

The automatic leveling mechanism of the invention interconnects the hitch structure 96 with the wheel control shaft 64 to move the attaching bar 106 vertically in response to vertical movement of the frame relative to the ground. The mechanism includes a lever or front support 118 mounted on the forward end of the frame for pivotal movement about a transverse axis, the lever comprising a pair of spaced bars 120, the inner sides of which are interconnected by a stop block 122. The lever extends between a pair of spaced brackets 124 and 126 which are fixed to and extend forwardly from the front side of the plate 26, and is pivotally supported on a pin 128 that extends transversely between the brackets. A compression link 130 connects the lower end of the lever 118 with the hitch structure 96 so that the upper end of the lever is moved fore and aft through an arcuate path described about the axis of the pin 128 in response to vertical movement of the hitch structure about the pins 116. As is shown in FIG. 2, the stop block 122 on the lever engages the front wall of the plate 26 on the frame to limit the rearward movement of the upper end of the lever. The forward end of the compression link 130 is pivotally mounted on a pin 132 that extends between a pair of plates 134 fixed centrally to the hitch brace 102, and the rearward end thereof is pivotally mounted on a pin 136 that extends between the lower ends of the bars 120. The compression link 130 comprises a pair of externally threaded eyebolts 138 and 140 interconnected by an internally threaded adjustment member 142. It will be appreciated that rotation of the member 142 will alter the effective length of the compression link 130, or the distance between the pins 132 and 136.

The leveling mechanism further includes a rear support or trunnion 144 mounted for rotational movement about a transverse axis between the upper ends of a pair of upright arms 146 secured to the top side of the wheel control shaft 64. The axis about which the trunnion is rotatable is defined by fasteners 148 which mount each side of the trunnion to one of the arms 146. It will be apparent that the trunnion or rear support 144 will move fore and aft through an arcuate path described about the axis of the wheel control shaft 64 as the frame is raised and lowered relative to the ground.

Completing the mechanism is a fore-and-aft extending tension link that connects the front and rear supports 118 and 144, respectively. The tension link comprises a rod 150 that is pivotally mounted at its forward end on a pin 152 that extends transversely between the upper ends of the bars 120. The rear portion of the rod 150 has a tube 154 slidably received thereon, and both the rod and tube are, in turn, slidably received in the trunnion 144 and extend rearwardly therefrom. The rearward end of the tube 154 has a flange 156 formed thereon, and the rear end of the rod 150 has an adjustment nut 158 threadably received thereon which is engageable by the flange 156 to limit the rearward movement of the tube relative to the rod. A helical compression spring 160 is received on that portion of the tube that extends rearwardly from the trunnion 144 and acts between the rear side of the trunnion and the flange 156 to bias the tension link rearwardly through the trunnion, and thereby bias the stop block 122 on the lever 118 rearwardly toward the plate 26. The biasing force exerted by the spring 160 can be adjusted by rotating the adjusting nut 158 on the end of the rod 150.

The operation and adjustment procedure for the leveling mechanism will now be described. The mechanism is first adjusted so that the frame will be level when the harrow is in its transport position shown in FIG. 2. Such an adjustment is necessary due to the variation in drawbar heights from tractor to tractor. In preparation for this adjustment, the harrow is raised to its transport position by extending the hydraulic cylinder 90, and the spring adjusting nut 158 is positioned to provide sufficient spring force so that the stop block 122 on the lever 118 is biased strongly against the frame, although the exact force exerted by the spring is not critical at this point. Next, the adjusting member 142 in the compression link 130 is turned to alter the length of the link until the frame is level.

To adjust the mechanism so that the frame is level in the operating position of the harrow, the cylinder 90 is retracted until the implement assumes its lowered working position. The spring adjusting nut 158 is then rotated to either increase or decrease the vertical load transferred to the tractor drawbar, until the front and rear gangs penetrate the soil to a uniform depth.

The mechanism is constructed and arranged so that a preload is imposed on the spring 160 when the harrow is raised to its transport position, which preload is substantially greater than that which would be necessary to hold the stop block 122 against the frame under static force levels. The preload in the spring results from the fact that the wheel control shaft 64, and thus the trunnion 144, moves through a substantial angle after the stop block 122 on the lever 118 initially engages the frame. As a result of this large preload, adjustments made to the nut 158 to increase or decrease the biasing force of the spring 160 when the harrow is in its working position, although they will have some effect on the magnitude of the spring preload in the transport position of the harrow, will not be so substantial that the preload will be reduced beyond the point at which it is sufficient to hold the stop on the lever against the frame under static loading conditions. It will be appreciated, of course, that once the transport leveling adjustment is made to the compression link 130, the harrow will remain level in the transport position so long as the stop 122 is against the frame, irrespective of the value of the preload in the spring 160. As a further result of this large preload in the spring 160, the hitch-to-frame connection is maintained substantially rigid during transport, although the connection will yield by further compressing the spring 160 when excessive dynamic loads are applied to the harrow. The spring 160 is thus operative in the transport position to maintain the stability of the implement, since it will resist the tendency of the implement to rock fore and aft about the axes of its wheels 78 and 82, and at the same time it acts as a shock absorber to cushion extreme dynamic loads imposed on the implement.

I claim:

1. A disk harrow comprising: a frame; ground-engaging disk gangs supported on the front and rear portions of the frame; wheel control shaft means supported on the frame for rotation about a transverse axis; wheel arm means connected to the shaft means and extending downwardly and rearwardly therefrom; ground-engaging wheel means rotatably supported on the outer ends of the arm means between the front and rear disk gangs; means for rotating the wheel control shaft means relative to the frame to raise and lower the frame relative to the wheel means and thereby raise and lower the frame relative to the ground; an upright arm secured to the wheel control shaft means and extending upwardly therefrom, said arm being movable rearwardly with the shaft as the latter is rotated to lower the wheel means relative to the frame; a trunnion mounted on the upper end of the arm for rotation about a transverse axis; a hitch structure connected to the forward end of the frame for vertical pivotal movement about a transverse axis, said structure extending forwardly of the frame and having tractor attaching means on its forward end movable vertically relative to the frame as the structure is pivoted about said transverse axis; a lever mounted on the forward end of the frame for pivotal movement about a transverse axis disposed above the pivot axis of the hitch structure, said lever having a lower end extending below and an upper end extending above the pivot axis of the lever; stop means on the lever engageable with the frame to limit rearward movement of the upper end of the lever relative to the frame; a compression link connecting the lower end of the lever to the hitch structure at a point forwardly of the pivot axis of the structure; a fore-and-aft extending tension link, the forward end of the link being pivotally connected to the upper end of the lever and the rear portion thereof being slidably received in the trunnion and extending rearwardly therethrough and terminating at a rear end; and a compression spring acting between the trunnion and the rear end of the tension link for biasing the tension link rearwardly relative to the trunnion and thereby biasing the stop means on the lever toward the frame.

2. The invention defined in claim 1 including means acting between the hitch structure and lever for adjusting the vertical position of the former relative to the latter, and thereby adjusting the height of the tractor attaching means on the forward end of the structure independently of the position of the lever.

3. The invention defined in claim 2 wherein the compression link is adjustable in length for adjusting the height of the tractor attaching means on the forward end of the hitch structure independently of the position of the lever.

4. The invention defined in claim 1 including means on the rear end of the tension link for varying the biasing force exerted by the compression spring.

5. The invention defined in claim 1 wherein said compression spring is an elongated helical spring coaxially received on that portion of the tension link which extends rearwardly from the trunnion.

6. The invention defined in claim 5 wherein the rear end of the tension link is threaded and including a mating threaded member on the threaded portion of the link, said member acting as a stop for the rear end of the spring.

7. The invention defined in claim 1 wherein the wheel control shaft means is rotatable to move the upright arm and thereby the trunnion mounted thereon rearwardly relative to the rear end of the tension link to compress the spring following engagement of the stop means on the lever with the frame.

8. Apparatus comprising: a frame; ground-engaging wheel means mounted on the frame for vertical movement relative thereto, for varying the height of the frame relative to the ground between a raised transport and lowered working position; a rear support member mounted on the frame for fore-and-aft movement relative thereto; means connecting the rear support member to the wheel means for moving the former rearwardly in response to movement of the latter downwardly relative to the frame and for moving the former forwardly in response to movement of the latter upwardly relative to the frame; hitch means having vehicle attaching means thereon, said hitch means being supported on the forward end of the frame for vertical movement of said vehicle attaching means relative to the frame as the latter is adjusted between transport and working positions; a front support member mounted on the forward end of the frame for fore-and-aft movement relative thereto; adjustable linkage means connecting the front support member to the vehicle attaching means for moving the former forwardly in response to movement of the latter upwardly and for moving the former rearwardly in response to movement of the latter downwardly; power means including a hydraulic cylinder mounted on the frame and operatively connected to the wheel means for adjusting the wheel means with respect to the frame so as to move the latter between transport and working positions; stop means on the front support member engageable with the frame for limiting the rearward movement of the front support member relative to the frame to a position commensurate with the frame being in transport position and as said power means moves the frame toward its transport position; a fore-and-aft extending tension link, the forward end of the link being connected to the front support member and the rear portion thereof being slidably received in the rear support member and extending rearwardly therefrom and terminating at a rear end; and a spring means acting between the rear support member and the rear end of the tension link for adjustably biasing the link rearwardly relative to the rear support member and thereby selectively biasing the stop means on the front support member toward the frame, said spring means being sufficiently yieldable to permit continued sliding between the tension link and rear support member after said stop means has engaged the frame and as said wheel means continues to move the frame toward its transport position.

9. The invention defined in claim 8 including wheel control shaft means supported on the frame for rotation about a transverse axis; wheel arm means connected to the shaft means and extending downwardly and rearwardly therefrom, said ground-engaging wheel means being rotatably supported on the outer ends of the arm means; an upright arm secured to the wheel control shaft means and extending upwardly therefrom; and wherein said rear support member comprises a trunnion mounted on the upper end of the arm for rotation about a transverse axis.

10. The invention defined in claim 8 wherein the wheel means are movable downwardly relative to the frame to move the rear support member rearwardly relative to the rear end of the tension link to increase the biasing force of the spring means following engagement of the stop means on the front support member with the frame.

11. The invention defined in claim 8 including means acting between the tension link and the spring for varying the biasing force exerted by the latter.

12. The invention defined in claim 8 wherein the spring is an elongated, helical compression spring coaxially received on that portion of the tension link which extends rearwardly from the rear support member.

13. The invention defined in claim 12 including an adjustable stop member threadably received on the rear end of the tension link for varying the biasing force exerted by the spring.

14. Apparatus comprising: a frame; ground-engaging wheel means mounted on the frame for vertical movement relative thereto, for varying the height of the frame relative to the ground; a rear support member mounted on the frame for fore-and-aft movement relative thereto; means connecting the rear support member to the wheel means for moving the former rearwardly in response to movement of the latter downwardly relative to the frame and for moving the former forwardly in response to movement of the latter upwardly relative to the frame; hitch means being supported for vertical movement about a first transverse axis on the forward end of the frame and extending forwardly therefrom and having vehicle attaching means on the foward end thereof; a vertically extending lever mounted on the forward end of the frame for fore-and-aft movement about a second transverse axis positioned above the transverse axis, said lever having an upper end above and a lower end below its transverse axis; a compression link connecting the lower end of the lever to the hitch means at a point forwardly of the first transverse axis for moving the former forwardly in response to movement of the latter upwardly and for moving the former rearwardly in response to movement of the latter downwardly, said compression link being adjustable in length for adjusting the height of the vehicle attaching means on the forward end of the hitch structure independently of the position of the lever; stop means on the lever engageable with the frame for limiting the rearward movement of the lever to the frame; a fore-and-aft extending tension link, the forward end of the link being connected to the upper end of the lever and the rear portion thereof being slidably received in the rear support member and extending rearwardly therefrom and terminating at a rear end; and a spring acting between the rear support member and the rear end of the tension link for biasing the link rearwardly relative to the rear support members and thereby biasing the stop means on the lever toward the frame.

15. The invention defined in claim 14 wherein the compression link is adjustable in length for adjusting the height of the vehicle attaching means on the forward end of the hitch structure independently of the position of the lever.

16. Apparatus comprising: a frame, ground-engaging wheel means mounted on the frame for vertical movement relative thereto, for varying the height of the frame relative to the ground between a raised transport and lowered working position: a rear support member mounted on the frame for fore-and-aft movement relative thereto; means connecting the rear support member to the wheel means for moving the former rearwardly in response to movement of the latter downwardly relative to the frame and for moving the former forwardly in response to movement of the latter upwardly relative to the frame; hitch means having vehicle attaching means thereon, said hitch means being supported on the forward end of the frame for vertical movement of said vehicle attaching means relative to the frame as the latter is adjusted between transport and working positions; a front support member mounted on the forward end of the frame for fore-and-aft movement relative thereto; adjustable means connecting the front support member to the vehicle attaching means for moving the former forwardly in response to movement of the latter upwardly and for moving the former rearwardly in response to movement of the latter downwardly; power means including a hydraulic cylinder mounted on the frame and operatively connected to the wheel means for adjusting the wheel means with respect to the frame so as to move the latter between transport and working positions; means on the frame for limiting the rearward movement of the front support member relative to the frame to a position commensurate with the frame being in transport position and as said wheel means moves the frame toward its transport position; a fore-and-aft extending tension link, one end of the link being connected to one of the support members and the other end of the link being slidably received in the other support member and extending therebeyond and terminating at an outer end spaced from said other support member in a direction away from said one support member; and a spring acting between said other support member and the outer end of the link for adjustably biasing said front and rear support members toward each other, said spring being sufficiently yieldable to permit continued sliding between the tension link and rear support member after said front support member has reached its position commensurate with the frame being in transport position and as said wheel means continues to move the frame toward its transport position.

17. Apparatus comprising: a frame; ground-engaging wheel means mounted on the frame for vertical movement relative thereto, for varying the height of the frame relative to the ground between a raised transport and lowered working position; a rear support member mounted on the frame for fore-and-aft movement relative thereto; means connecting the rear support member to the wheel means for moving the former rearwardly in response to movement of the latter downwardly relative to the frame and for moving the former forwardly in response to movement of the latter upwardly relative to the frame; hitch means having vehicle attaching means thereon, said hitch means being supported on the forward end of the frame for vertical movement of said vehicle attaching means relative to the frame as the latter is adjusted between transport and working positions; power means on the frame operatively connected to the wheel means for vertically positioning the frame between transport and working positions; a front support member mounted on the forward end of the frame for fore-and-aft movement relative thereto; adjustable linkage means connecting the front support member to the vehicle attaching means for moving the former forwardly in response to movement of the latter upwardly and for moving the former rearwardly in response to movement of the latter downwardly; means on the frame for limiting the rearward movement of the front support member relative to the frame to a position commensurate with the frame being in transport position and as said wheel means moves the frame toward its tranport position; and means connecting the front and rear support members for adjustably biasing said members toward each other, and yieldably permitting additional rearward movement of the rear support member after the means on the frame has limited the rearward movement of the front support member to its position commensurate with the frame being in transport position.

18. The invention defined in claim 17 in which the means connecting the front and rear support members is a link connected at one end to one of the support members and slidably received at the other end in the other support member and wherein the other end of the link extends beyond said other support member in a direction away from said one support member and terminates at an outer end, and wherein said means for biasing said members toward each other further includes a compression spring acting between said outer end and said other support member.

19. A disk harrow comprising: a frame; ground-engaging disk gangs supported on the front and rear portions of the frame; wheel control shaft means supported on the frame for rotation about a transverse axis; wheel arm means connected to the shaft means and extending downwardly and rearwardly therefrom; ground-engaging wheel means rotatably supported on the outer ends of the arm means between the front and rear disk gangs; means for rotating the wheel control shaft means relative to the frame to raise and lower the frame relative to the wheel means and thereby raise and lower the frame relative to the ground between a raised transport and lowered working positions; an upright rear support member secured to the wheel control shaft means and extending upwardly therefrom, said member being movable rearwardly with the shaft as the latter is rotated to lower the wheel means relative to the frame and movable forwardly with the shaft as the latter is rotated to raise the wheel means relative to the frame; a hitch structure connected to the forward end of the frame for vertical pivotal movement about a transverse axis, said structure extending forwardly of the frame and having tractor attaching means on its forward end movable vertically relative to the frame as the structure is pivoted about said transverse axis; a front support member mounted on the forward end of the frame for fore-and-aft pivotal movement about a transverse axis; adjustable means connecting the hitch structure and the front support member for moving the latter forwardly in response to movement of the former upwardly and for moving the latter rearwardly in response to movement of the former downwardly; means on the frame for limiting the rearward movement of the front support member relative to the frame to a position commensurate with the frame being in transport position and as said wheel means moves the frame toward its transport position; a fore-and-aft extending tension link, one end of the link being connected to one of the support members and the other end of the link being slidably received in the other support member and extending therebeyond and terminating at an outer end spaced from said other support member in a direction away from said one support member; and a spring acting between said rear support member and the outer end of the link for adjustably biasing said front and rear support members toward each other, said spring means being sufficiently yieldable to permit continued sliding between the tension link and the respective support member after said front support member has been limited in its rearward movement to a position commensurate with the frame being in transport position and as said wheel means continues to move the frame toward its transport position.

* * * * *